United States Patent [19]

Chen et al.

[11] 4,159,210

[45] Jun. 26, 1979

[54] MAPLE SUGAR PRODUCT AND METHOD OF PREPARING AND USING SAME

[75] Inventors: Andy C. C. Chen, Belle Mead, N.J.; Sanford J. Drescher, Brooklyn; Charles P. Graham, Hicksville, both of N.Y.

[73] Assignee: Amstar Corporation, New York, N.Y.

[21] Appl. No.: 915,719

[22] Filed: Jun. 15, 1978

[51] Int. Cl.² .......................... C13F 1/02; A23L 1/09; A23L 1/221

[52] U.S. Cl. ........................................ 127/29; 127/30; 127/58; 127/61; 426/98; 426/103; 426/650; 426/658; 426/659

[58] Field of Search ........................ 127/29, 30, 58, 61; 426/98, 103, 650, 658, 659

[56] References Cited

U.S. PATENT DOCUMENTS

| | | | |
|---|---|---|---|
| 1,467,007 | 9/1923 | Paine | 127/30 |
| 1,970,870 | 8/1934 | Skazin | 127/30 X |
| 3,169,888 | 2/1965 | Ryan | 127/30 |
| 3,194,682 | 7/1965 | Tippens | 127/30 |
| 3,305,447 | 2/1967 | Reimers | 127/30 X |
| 3,365,331 | 1/1968 | Miller | 127/30 |
| 3,642,535 | 2/1972 | Graham | 127/29 |

OTHER PUBLICATIONS

"Uses of Sugars and Other Carbohydrates in the Food Industry," No. 12 of the Advances in Chemistry Series, pp. 126–131, ACS, Wash., D.C., (1955).

U.S. Dept. of Agriculture Farmer's Bulletin, No. 1366, (1935), pp. 24–33.

*Primary Examiner*—Sidney Marantz

*Attorney, Agent, or Firm*—Cooper, Dunham, Clark, Griffin & Moran

[57] ABSTRACT

A transformed, crystallized maple sugar product comprising aggregates of crystals having a crystal size in the range about 3–50 microns is prepared by concentrating a maple syrup containing at least about 63% sucrose to a solids content of about 93–98%. The concentration may be carried out in several ways depending upon the color of the final product which is desired. The concentrated syrup is subjected to impact beating within a crystallization zone for transformation and crystallization. The resulting transformed, crystallized maple sugar product comprising aggregates of sucrose crystals having a size in the range about 3–50 microns and having a moisture content of 2–4% is then recovered from the crystallization zone and dried to a moisture content below about 1% by weight. Subsequently, the maple sugar product may be cooled, milled and/or screened to a size range suitable for one of several desired end uses.

15 Claims, 1 Drawing Figure

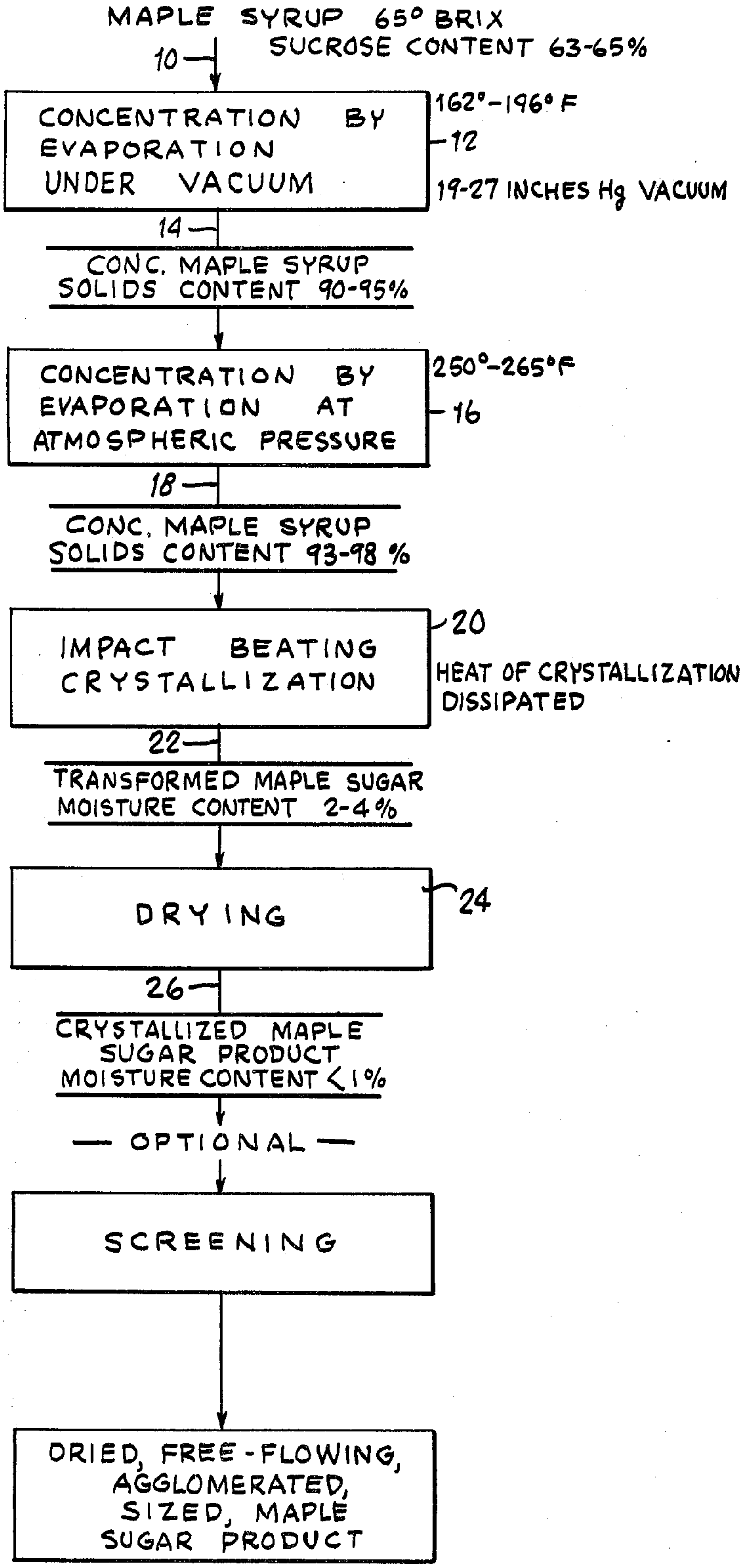
MAPLE SYRUP 65° BRIX
SUCROSE CONTENT 63-65%
10
CONCENTRATION BY EVAPORATION UNDER VACUUM
162°-196° F
12
19-27 INCHES Hg VACUUM
14
CONC. MAPLE SYRUP SOLIDS CONTENT 90-95%
CONCENTRATION BY EVAPORATION AT ATMOSPHERIC PRESSURE
250°-265°F
16
18
CONC. MAPLE SYRUP SOLIDS CONTENT 93-98 %
IMPACT BEATING CRYSTALLIZATION
20
HEAT OF CRYSTALLIZATION DISSIPATED
22
TRANSFORMED MAPLE SUGAR MOISTURE CONTENT 2-4 %
DRYING
24
26
CRYSTALLIZED MAPLE SUGAR PRODUCT MOISTURE CONTENT <1%
— OPTIONAL —
SCREENING
DRIED, FREE-FLOWING, AGGLOMERATED, SIZED, MAPLE SUGAR PRODUCT

MAPLE SUGAR PRODUCT AND METHOD OF PREPARING AND USING SAME

BACKGROUND OF THE INVENTION

In the northern United States and Canada the sap of hard maple trees (Acer Saccharinum) is a source of sugar, largely sucrose, but containing impurities that impart a delicate flavor. Maple sap containing 2-3% sugar as it comes from the tree has no maple flavor and no color. The characteristic flavor and maple color result from reactions that occur when maple sap is evaporated and concentrated to the syrup form by boiling. For conventional maple sugar production, concentration is carried to the graining point to produce a soft brown "whole sugar," that is, the syrup and sugar crystals are allowed to form a solid mass without separation.

Commercial maple syrup typically has about a 66° Brix with water activity of 0.83-0.85 and is very susceptible to yeast and mold contamination. Also, since maple syrup is readily fermentable, it must be stored under very restricted conditions.

Block maple sugar is a traditional product of the maple syrup industry. However, block maple sugar is unstable during a long period of storage and is costly to produce. Further, production of maple syrup from block maple sugar requires grinding and/or crushing by potential users, many of whom do not have the necessary equipment. As a result, there is a need for a maple sugar product better suited for shipment and storage in bulk quantities and more readily convertible into maple syrup.

Maple sugar in a granulated free-flowing form would be useful in many applications as a maple flavorant. However, conventional granulated maple sugar readily takes up and retains moisture, i.e. cakes, on standing, and therefore, has not been especially useful. An anti-caking agent such as micronized silica could be incorporated to prevent caking, but most anti-caking agents impart undesirable characteristics, such as turbidity and poor dispersibility, in the finished product. Thus, there has been a need for a maple sugar product in a granulated form which is free-flowing and non-caking.

SUMMARY OF THE INVENTION

The present invention provides a new maple sugar product and method of preparing the same. This new maple sugar product is capable of meeting the needs and overcoming the problems indicated or set forth hereinabove. Specifically, the maple sugar product of this invention has an agglomerated, micro-sized crystalline structure and is capable of reconstitution to a pure maple syrup. Also, the maple sugar product of this invention has a low moisture content and is generally substantially non-hygroscopic. Finally, a maple sugar product of this invention is in a granulated form which is free-flowing and non-caking and is useful as a substantially instantly soluble maple sugar or a maple sugar product capable of direct compaction to produce tabletted maple sugar.

The maple sugar product of this invention is prepared by concentrating a maple syrup containing at least about 63% sucrose to a solids content of about 93-98%. The concentration may be carried out in several ways depending upon the color of the final product which is desired. Thus, the maple syrup may be heated at a temperature in the range 162°-196° F. at 19-27 inches Hg vacuum to produce a concentrate having minimal color changes. Alternatively, the concentration may be carried out in two stages. In the first stage the maple syrup is heated to a temperature in the range 162°-196° F. at 19-27 inches Hg vacuum until the solids content is at least 90%. In the second stage, the syrup is further concentrated by heating at a temperature in the range 250°-265° F. at atmospheric pressure until the solids content is in the range 93-98%. The color of the concentrate so prepared is slightly darker than the original color of the syrup. Finally, the concentration may be carried out at atmospheric pressure at a temperature in the range 250°-265° F. to produce a concentrate which is quite darker than the original syrup. The concentrated syrup resulting from any of these approaches is subjected to impact beating within a crystallization zone until transformation and crystallization of the syrup occur. The resulting transformed, crystallized sugar product having a moisture content of 2-4% is then recovered from the crystallization zone and desirably dried to a moisture content below 1% by weight. Subsequently, the crystallized maple sugar product may be cooled, milled and screened to a size range suitable for one or more intended end uses.

Accordingly, it is an object of this invention to provide a novel maple sugar product which has several advantageous characteristics and meets one or several needs in the maple syrup industry.

It is a related object to provide a method of preparing this maple sugar product.

A further object is to provide a method of preparing a reconstituted maple syrup.

Additional objects of this invention involve the preparation of a maple sugar product and the preparation of instantly soluble or tabletted maple sugar products and flavoring compositions therefrom.

In at least one embodiment of the practices of this invention, at least one of the foregoing objects will be achieved.

How these and other objects of the present invention are accomplished will be more fully understood from the detailed description of the invention and the claims which follow and the accompanying drawing wherein there is illustrated a flow chart showing a preferred process or scheme for the production of the transformed, crystallized maple sugar product prepared in accordance with the practices of this invention.

Detailed Description Of The Invention

Concentrated natural maple syrup typically has a Brix of about 66° and is composed primarily of sucrose with small amounts of invert sugar and other soluble and/or flavor-imparting components. Typical analyses of commercial maple syrups of various grades are shown in Table I.

Table I

Typical Analyses Of Commercial Maple Syrups*

| | Fancy | A Grade | B Grade | C Grade |
|---|---|---|---|---|
| Sucrose Content | 64.52% | 63.35% | 64.02% | 63.85% |
| Reducing Sugar | 0.22% | 1.06% | 0.21% | 0.15% |
| Ash Content | 0.86% | 0.77% | 0.75% | 1.13% |
| Solids Content | 67.30% | 67.48% | 66.93% | 66.11% |
| pH Value | 7.10 | 6.72 | 7.05 | 7.60 |
| Protein | 0.10% | 0.05% | 0.11% | 0.11% |
| Color (ASAR Units) | 1656 | 4400 | 6000 | 9798 |

*Vermont Pure Maple Syrups Supplied By U.S.D.A.

Such natural maple syrups are converted into the maple sugar product of the present invention according to the process set forth herein. Referring now to the drawing which schematically illustrates a preferred embodiment of this invention, maple syrup 10 containing at least 63% sucrose is concentrated 12 by evaporation at 19–27 inches Hg vacuum and at a temperature in the range 162°–196° F. until the solids content of the concentrated maple syrup exceeds about 90%. The resulting concentrated maple syrup 14 having a solids content of at least 90% is maintained at a temperature sufficiently high, e.g. a temperature in the range 170°–180° F., to prevent solidification or crystallization and the pressure increased to ambient or atmospheric pressure, e.g. by transferring the concentrated syrup to an open pan or kettle. The syrup is then further concentrated 16 by continued evaporation at atmospheric pressure and at a temperature of 250°–265° F. until the solids content is increased to 93–98%.

The resulting concentrated maple syrup 18 having a solids content in the range 93–98% is then subjected to impact beating crystallization 20 within a suitable crystallization zone such as a Hobart Mixer or Turbulizer until the syrup is transformed and crystallized. The transformed, crystallized maple sugar product 22 which results has a moisture content of about 2–4% and is comprised of aggregates of sucrose crystals having a crystal size in the range about 3–50 microns. During impact beating crystallization it is desirable to remove the heat of crystallization to prevent overheating within the crystallization zone. Heat of crystallization can be removed or dissipated by indirect heat exchange, e.g. water jacket surrounding the crystallization zone, or by flowing relatively cool air therethrough to remove water vapor and to cool the sugar product undergoing crystallization.

Crystallized maple sugar product 22 is dried 24 to produce a transformed, crystallized maple sugar product 26 having a moisture content less than 1%. This transformed, crystallized maple sugar product may subsequently be cooled, milled and screened to a size range suitable for one of several end uses for this product described more fully hereinafter.

The final solids content of the concentrated maple syrup after both evaporation under vacuum and at atmospheric pressure, as well as the inducing time through the crystallization zone, are highly dependent upon the nature and amount of the non-sucrose solids in the original maple syrup. Accordingly, different grades of maple syrup, such as those described in Table I, when concentrated at a given elevated temperature, tend to exhibit both different final solids contents and inducing times for crystallization. Thus, it has been found that if evaporation at atmospheric pressure is carried out at a temperature of 255°–265° F. for all grades of maple syrup, the maple sugar product is produced with a minimum of processing difficulties.

In order to prevent chemical changes such as sugar inversion, lowered pH, sugar carmelization and flavor degradation during prolonged exposure to high temperature when using open pan or kettle evaporation at atmospheric pressure, a syrup having a solids content of at least 90% should be used during this stage of the process. Thus, the initial evaporation under vacuum is most desirably continued until the solids content exceeds 90%.

The following examples more fully show the practices of this invention but are not meant in any way to limit the scope thereof.

EXAMPLE 1

1,000 grams of 67.3° Brix fancy grade maple syrup having a sucrose content of 64.54% was evaporated in a rotary evaporator at 181°–190° F. with a vacuum reading of 25.5–26 inches Hg until a concentrated syrup having a solids content of 94.79% was obtained. The concentrated syrup was then transferred to an open pan at atmospheric pressure and heated until it reached a temperature of 255° F. and a solids content of 96.27%.

The supersaturated syrup was kept at this elevated temperature and agitated in a Hobart Blender at a medium speed until transformation and crystallization occurred. The inducing time for crystallization was 125 seconds and the moisture content of the resulting crystallized sugar product was 3.20% by weight. The transformed, crystallized sugar product was then oven-dried to a moisture content of 0.16%, cooled, milled and screened to a desired size range.

EXAMPLE 2

1,000 grams of 67.48° Brix grade A maple syrup having a sucrose content of 63.35% was evaporated in a rotary evaporator at 162°–165° F. with a vacuum reading of 26–27 inches Hg to a solids content of 90.81% by weight. The concentrated syrup was then placed in an open pan or kettle and heated to a temperature of 265° F. and a solids content of 95.38%. The supersaturated syrup was then agitated in a Hobart Blender at a medium speed until transformation and crystallization occurred. The inducing time for crystallization was 145 seconds and the moisture content of the transformed, crystallized maple sugar product was 2.17%. The transformed, crystallized maple sugar product was then oven-dried to a moisture content of 0.23%, cooled, milled, and screened to a desired size range.

EXAMPLE 3

1,000 grams of 67.30° Brix grade B maple syrup having a sucrose content of 64.52% was evaporated in a rotary evaporator at 192°–196° F. at a reduced pressure at a vacuum reading of 21–22.5 inches Hg until a solids content of 93.52% was reached. The concentrated syrup was then placed in an open pan and heated to a temperature of 260° F. and a resulting solids content of 96.98%. The concentrated, supersaturated syrup was agitated in a Hobart Blender at a medium speed until transformation and crystallization occurred. The inducing time for crystallization was 85 seconds. The transformed, crystallized sugar product was then oven-dried to a moisture content of 0.18%, cooled, milled, and screened to a desired size range.

EXAMPLE 4

1,000 grams of 66.11° Brix grade C maple syrup having a sucrose content of 63.65% was evaporated in a rotary evaporator at 162°–168° F. under a vacuum reading of 24.5 inches Hg to a solids content of 88.87%. The concentrated syrup was then placed in an open pan and heated to a temperature of 250° F. and a solids content of 93.05%. The resulting concentrated, supersaturated syrup was agitated in a Hobart Blender at a medium speed until transformation and crystallization took place. The inducing time for crystallization was 205 seconds and the moisture content after crystallization was 2.10%. The transformed, crystallized maple sugar product was then oven-dried to a moisture content of 0.18%, cooled, milled and screened. An analysis of the dehydrated natural maple sugar products prepared in Examples 1-4 is set forth in Table II.

Table II

| | Analysis of Dehydrated Natural Maple Sugar Products | | | |
|---|---|---|---|---|
| Grade (Example No.) | Fancy (#1) | A Grade (#2) | B Grade (#3) | C Grade (#4) |
| Sucrose Content | 95.55% | 94.15% | 94.15% | 94.64% |
| Reducing Sugar | 0.34% | 1.68% | 0.54% | 0.35% |
| Moisture Content | 0.16% | 0.23% | 0.18% | 0.18% |
| pH Value | 7.05 | 6.70 | 7.02 | 7.65 |
| Ash Content | 1.25% | 1.09% | 1.37% | 1.62% |
| Color (ASR units) | 1686 | 5086 | 6887 | 19200 |

The transformed, crystallized maple sugar products prepared in accordance with the process described hereinabove contain all of the solids of the original maple syrup, including the non-sugar solids. In structure, the transformed, crystallized sugar product exists as individual grains and clusters of agglomerates of microscopic crystals of sucrose, e.g. 3-50 microns crystal size, along with less than 2% by weight invert sugar and 6% by weight non-sugar solids. The invert sugar and non-sugar solids are found mostly in the interstitial spaces between the sucrose crystals forming the agglomerates. This structure is distinctly different from the structure of conventional granulated maple sugar which exists as sucrose grains having a characteristic crystalline structure and coated with impurities. Conventional granulated maple sugar has long been known for its tendency to cake on storage. In contrast, the transformed, crystallized maple sugar of the present invention maintains free-flowing, non-caking properties even when stored for substantial periods of time.

The agglomerates of transformed, crystallized maple sugar product of this invention consist of loose, lacey, porous clusters of minute individual syrup-coated sugar (sucrose) crystals bonded together at their interfaces by point contact. Accordingly, aqueous liquid can rapidly penetrate the agglomerates and free each of the individual crystals making up the agglomerates, which crystals then become dispersed and/or dissolved in the aqueous liquid.

In addition to those qualities traditionally associated with maple sugar, namely, delicate maple flavor and sweetness, the transformed, crystallized maple sugar product of the present invention can be functionally characterized as free-flowing and resistant to caking; as having a micro-sized structure of a porous nature; as being partially comprised of agglomerates; and capable of instantly dissolving in aqueous liquids. Because of these functional characteristics, the transformed, crystallized maple sugar products of the present invention have diverse applications.

For example, a reconstituted maple syrup product can be prepared by adding a suitable amount of water at a temperature of about 180° F. to the transformed, crystallized maple sugar product. Thus, transformed crystallized maple sugar products (prepared from Fancy, A, B, and C grades maple syrups) were reconstituted to 66° Brix by the addition of hot water (temperature of 170-190° F.). The resulting maple syrup products exhibited both flavor and color characteristics associated with the syrup from which they were prepared. The color degradation of grade C syrup was attributed to the fact that the evaporation at reduced pressure was not carried out for a sufficient period of time. The color level of these reconstituted maple syrup products is shown in Table III.

Table III

| Color Level Of Reconstituted Maple Syrup (ASR Units) | | | | |
|---|---|---|---|---|
| | Fancy | A Grade | B Grade | C Grade |
| Original Maple Syrup | 1656 | 4400 | 6000 | 9798 |
| Reconstituted Product | | | | |
| Concentration Temperature: | | | | |
| 250° F. (I) | 1654 | 5086 | — | 14674 |
| 255° F. (I) | 1686 | — | 6824 | 18049 |
| 260° F. (I) | 1836 | 5086 | 6887 | 19200 |
| 265° F. (I) | — | 6086 | 6949 | — |

The transformed, crystallized maple sugar product of the present invention can also be used in the preparation of a bakery fondant maple sugar product. This bakery fondant maple sugar product is prepared by mixing the maple sugar product with about 12% cold water and 6% corn syrup and whipping the admixture until smooth. For example, the transformed, crystallized maple sugar product of the present invention was screened to the desired particle size as illustrated in Table IV for bakery fondant sugar preparations. Maple sugar fondant was made by the addition of about 12% cold water and about 6% corn syrup to the maple sugar product. The admixture was whipped until smooth (about 4 minutes) without heating or curing. A variety of fruit, cream and fudge icings can also be prepared in a similar way by whipping the appropriate ingredients along with the water, corn syrup and other sugars.

Table IV

| Typical Analysis Of Fondant And Tabletting Maple Sugars | | |
|---|---|---|
| | Fondant Sugar | Tabletting Sugar |
| Sucrose | 93.01% | 92.24% |
| Reducing Sugar | 1.76% | 2.45% |
| Ash | 1.14% | 1.37% |
| Moisture Content | 0.80% | 0.68% |
| Screen Analysis | | |
| No. 35 | — | 0.03% |
| 65 | 0.03% | 49.45% |
| 100 | 16.32% | 30.00% |
| 150 | 20.51% | 13.76% |
| 200 | 22.17% | 4.18% |
| Pan | 40.97% | 2.58% |

Another use of the transformed, crystallized maple sugar product of this invention, as indicated herein, is for the preparation of a tabletted maple sugar product. Tabletted maple sugar product is prepared by screening the transformed crystallized maple sugar to the desired particle size for tabletting sugar, as indicated in Table IV, and compacting the sugar preparation to form tablets.

The transformed, crystallized maple sugar product is also useful as part of a maple flavoring composition or mix wherein the maple sugar product comprises an effective flavor-imparting amount such as about 10-20% of the composition or mix together with other ingredients such as granulated white sugar and/or brownulated sugar. This composition or mix can be packed in plastic jars with shaker tops for use in sprinkling applications.

Finally, the transformed, crystallized maple sugar product can be used for flavor encapsulation. A flavoring composition which comprises about 2% of a flavor oil such as artificial or natural cinnamon or peppermint flavor oil may be encapsulated or contained within the transformed maple sugar product by simple blending or admixing.

As will be apparent to one skilled in the art, many modifications, variations and alterations are possible in the practices of this invention without departing from the spirit or scope thereof.

What is claimed is:

1. A method of preparing a crystallized maple sugar product which comprises the steps of:
   concentrating a maple syrup to a solids content of 93–98%;
   subjecting said concentrated syrup to impact beating within a crystallization zone until transformation and crystallization occur and a maple sugar product made up of aggregates of sucrose crystals having a crystal size in the range 3–50 microns and a moisture content of 2–4% by weight is produced;
   recovering said resulting crystallized maple sugar product from said crystallization zone; and
   drying said crystallized maple sugar product to a moisture content of less than 1%.

2. The method of claim 1 wherein said concentration comprises heating at a temperature in the range 162–196° F. and at a pressure of 19–27 inches Hg vacuum.

3. The method of claim 1 wherein said concentration comprises heating at a tempeature in the range 162–196° F. and at a pressure of 19–27 inches Hg vacuum to a solids content of at least 90% and further heating at a temperature in the range 250–265° F. and at atmospheric pressure.

4. The method of claim 1 wherein said concentration comprises heating at a temperature in the range 250°–265° F. and at atmospheric pressure.

5. A method in accordance with claim 1 wherein said maple syrup has a sucrose content of at least about 63% by weight.

6. A maple sugar product prepared in accordance with the methods of claims 1, 2, 3 or 4.

7. A maple flavoring composition which comprises an effective flavor-imparting amount of the maple sugar product of claim 6 and other ingredients such as granulated white sugar and/or brown sugar.

8. A flavoring composition which comprises flavor oil encapsulated within or admixed with the maple sugar product of claim 6.

9. A method of preparing a reconstituted maple syrup product which comprises adding a suitable amount of hot water to the sugar product of claim 6.

10. A reconstituted maple syrup product prepared in accordance with claim 9.

11. A method of preparing a bakery fondant sugar product which comprises admixing the maple sugar product of claim 6 with a sufficient amount of cold water, corn syrup and other sugars and then whipping the admixture until smooth.

12. A bakery fondant sugar product prepared in accordance with claim 11.

13. A method of preparing a tabletted maple sugar product which comprises tabletting or compacting the maple sugar product of claim 6.

14. A tabletted maple sugar product prepared in accordance with claim 1.

15. A crystallized maple sugar product consisting essentially of a major amount by weight of agglomerates of microscopic crystals of sucrose having a crystal size in the range 3–50 microns, less than 2% by weight invert sugar and about 6% by weight non-sugar solids derived solely from maple syrup, said invert sugar and non-sugar solids being found mostly in the interstitial spaces between said sucrose crystals forming said agglomerates.

* * * * *